United States Patent
Roberts et al.

(10) Patent No.: US 8,732,146 B2
(45) Date of Patent: May 20, 2014

(54) DATABASE INTEGRATED VIEWER

(75) Inventors: Scott M. Roberts, Bothell, WA (US); Siddharth Jayadevan, Seattle, WA (US); Donald F. Box, Bellevue, WA (US); Laurent Mollicone, Kirkland, WA (US); James R. Flynn, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 238 days.

(21) Appl. No.: 12/698,038

(22) Filed: Feb. 1, 2010

(65) Prior Publication Data
US 2011/0191384 A1 Aug. 4, 2011

(51) Int. Cl.
*G06F 17/30* (2006.01)

(52) U.S. Cl.
USPC .......................................... 707/705; 707/717

(58) Field of Classification Search
None
See application file for complete search history.

(56) References Cited

U.S. PATENT DOCUMENTS

| | | | |
|---|---|---|---|
| 5,519,866 A | 5/1996 | Lawrence et al. | |
| 7,272,819 B2 | 9/2007 | Seto et al. | |
| 7,475,075 B2 | 1/2009 | Lindhorst et al. | |
| 2005/0004933 A1 | 1/2005 | Potter | |
| 2005/0240901 A1 | 10/2005 | McKnight | |
| 2005/0246637 A1 | 11/2005 | Knight et al. | |
| 2006/0195460 A1 | 8/2006 | Nori et al. | |
| 2006/0206864 A1 | 9/2006 | Shenfield et al. | |
| 2009/0018991 A1* | 1/2009 | Thiyagarajan et al. | 707/2 |

OTHER PUBLICATIONS

Allison et al., "SQL for Microsoft Access", Jun. 20, 2008, Jones & Bartlett Learning, 17 Pages.*
Granta MI 1.3 Release Notes—Published Date: 2007 http://www.grantadesign.com/download/pdf/GRANTA_MI_Release_Notes_1.3.pdf (22 pages).

* cited by examiner

*Primary Examiner* — Hung Q Pham
(74) *Attorney, Agent, or Firm* — Nicholas Chen; David Andrews; Micky Minhas

(57) ABSTRACT

A database integration viewer that allows additional properties to be associated with a record as viewed in a single record or table, even though those additional properties are not owned by the record in the underlying source record or table in the database. Using this integration view, a viewed version of record or table may be different than the actual structure of the source record or table. In the viewed version of the record or table, the viewed record or table or may include some or all of the properties for the records of the subject record or table, while incorporating one or more additional properties for the record into the viewed table. The properties may be scalars, or may be computed to populate the viewed version of the record or table.

20 Claims, 7 Drawing Sheets

DATABASE INTEGRATED VIEWER

BACKGROUND

Databases allow data to be conveniently accessed and searched by a computing system, and are thus an efficient way for a computing system to store and organize information. A database is a logically related collection of records. Each record may include one or more properties having associated values. Often, such records are organized into tables with each row in the table corresponding to a record, and each column corresponding to a particular property. Often there are multiple tables in a database. A record viewer allows a user to view a record in the database, whereas a table viewer allows the user to view a table in the database.

Typically, such viewers allow the user to view the records and tables as they exist in the database. For instance, if a table in the database includes 35 records (or 35 rows), with each record having potentially 6 properties (or 6 columns), that is the table that the user would see using the table viewer of the database. If the user were then to view another table having 71 records each having 5 properties, that is also what the user would see in the table viewer. To compare properties of multiple tables, the user typically navigates from one table to the next, to gather the relevant data.

BRIEF SUMMARY

At least one embodiment described herein relates to a database integration viewer that allows additional properties to be associated with a record or table as viewed, even though those additional properties are not owned by the record in the underlying source record or table in the database. Thus, using this integration view, a viewed version of the record or table may be different than the actual structure of the source record or table. In the viewed version of the record or table, the viewed record or table or may include some or all of the properties for the record(s), while incorporating one or more additional properties for the record(s) into the viewed record or table, even though those additional properties are not owned by the record(s) in the actual subject record table of the database.

The additional properties may be any property that a user may find helpful. The additional properties may be properties from other record tables that are different from the actual subject record or table upon which the viewed record or table is constructed. The additional properties may be scalar values, or may be computed properties that result from some computation. Accordingly, the viewed records or tables provided by the integration viewer are not limited to the underlying structure of any given record or table of the database, allowing users to obtain a much more tailored view on the information represented by the database.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

In accordance with embodiments described herein, a database integration viewer is described that allows additional properties to be associated with a record as viewed in a single record or table, even though those additional properties are not owned by the underlying record or table in the database. Using this integration view, a viewed version of a record or table may be different than the actual structure of the source record or table within the database. In the viewed version of the record or table, the viewed record or table or may include some or all of the properties for the record(s) from the database, while incorporating one or more additional properties for the record into the viewed record or table. The properties may be scalars, or may be computed to populate the viewed version of the table. First, some introductory discussion regarding computing systems will be described with respect to FIG. 1. Then, various embodiments of the database integration viewer using computed properties will be described with reference to FIGS. 2 through 6B.

Figure 1:
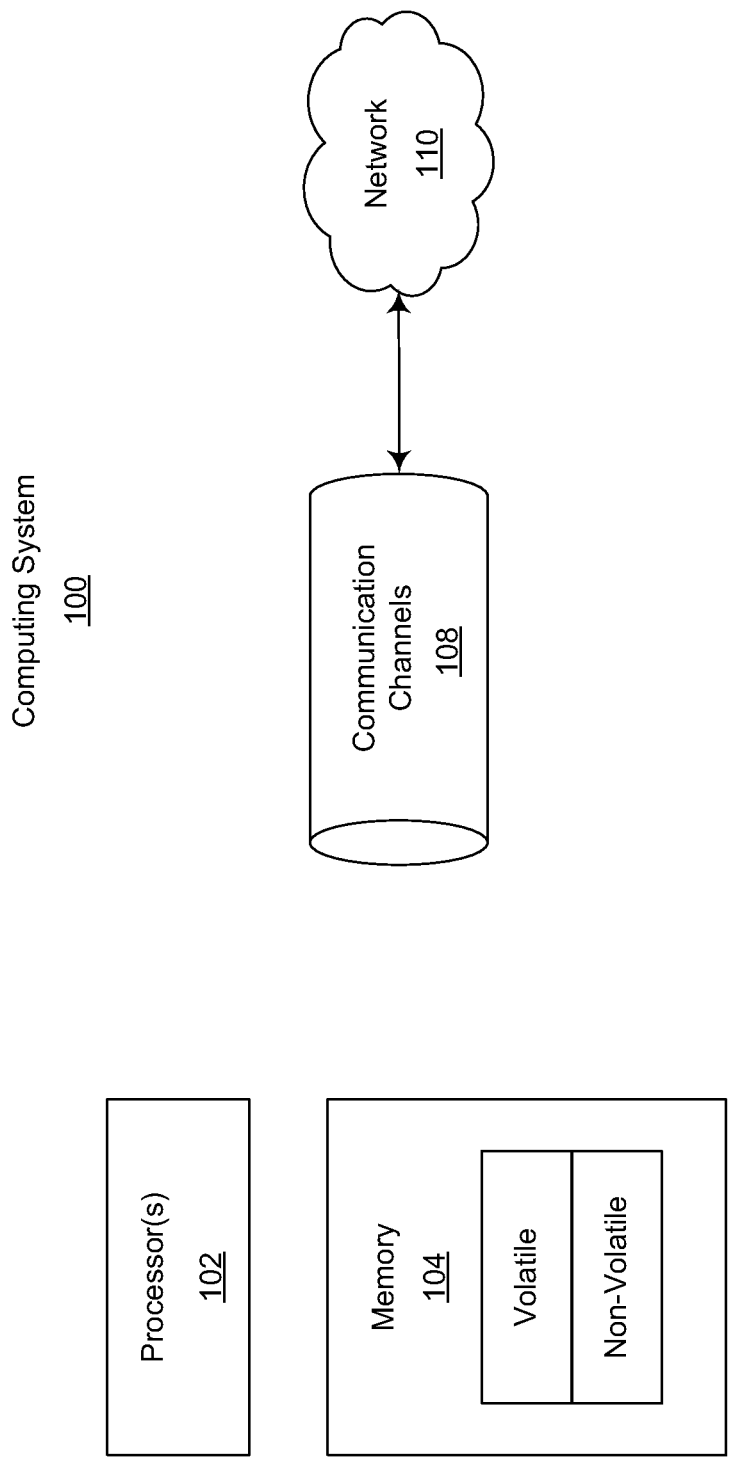
FIG. 1 illustrates an example computing system that may be used to employ embodiments described herein.

First, introductory discussion regarding computing systems is described with respect to FIG. 1. Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module"

or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100.

Computing system 100 may also contain communication channels 108 that allow the computing system 100 to communicate with other message processors over, for example, network 110. Communication channels 108 are examples of communications media or "transitory" media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

Embodiments within the scope of the present invention also include a computer program product having computer-readable media for carrying or having computer-executable instructions or data structures stored thereon. Such computer-readable media (or machine-readable media) can be any available media that can be accessed by a general purpose or special purpose computer. By way of example, and not limitation, such computer-readable media can comprise physical non-transitory storage and/or memory media such as RAM, ROM, EEPROM, CD-ROM, DVD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims. The computer-executable instructions cause the computer or processing device to perform the function or group of functions because the computer-executable instructions have a certain structure. If digitally represented, for example, such structures may represent one or more bits of information. In the case of magnetic storage media, for example, such as structure may be a level and/or orientation of magnetism on the media at predetermined parts of the magnetic storage media. In the case of optical storage media, for example, such a structure may be a level of reflectivity of the media at particular predetermined parts of the optical media.

Figure 2A:
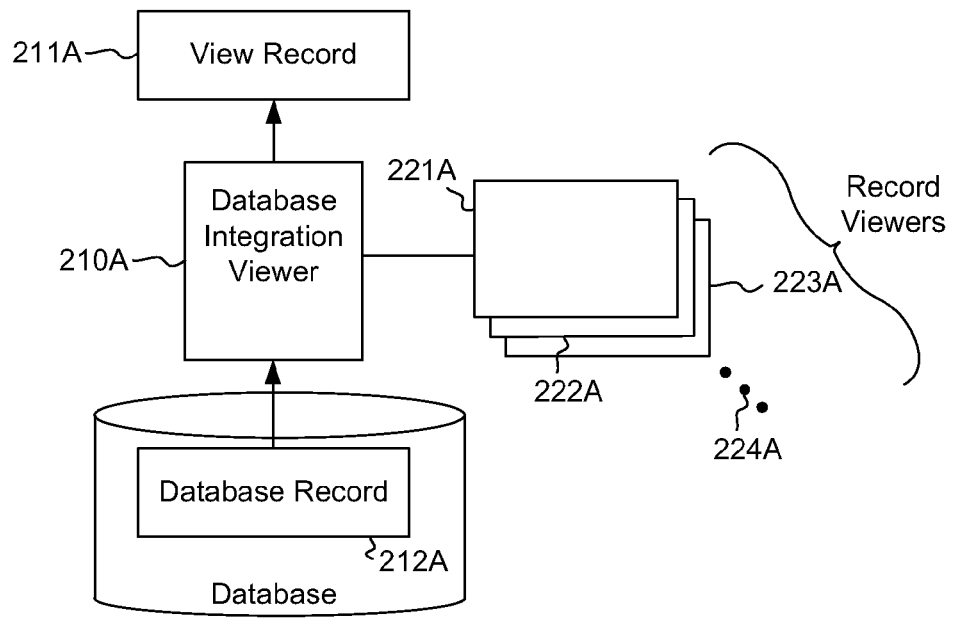
FIG. 2A illustrates an environment in which a database integration viewer formulates a view record that is a view of a database record.
Figure 3A:
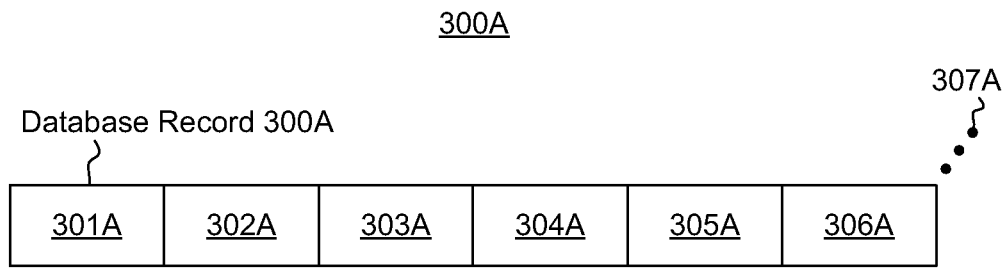
FIG. 3A illustrates a record that includes multiple properties.

FIG. 2A illustrates an environment 200A in which a data integration viewer 210A may be used to formulate a view record 211A that is a view of a database record 212A. The database record 212A is an actual record in a database, whereas the view record 211A is simply a view on that database record 212A, and need not reflect the actual structure of the record exactly. FIG. 3A illustrates a database record 300A. A typical database record includes any number of properties. The example database record 300A of FIG. 3A includes properties 301A through 306A. The ellipses 307A represent, however, that database records may have any number of properties. As an example, a club membership record might include properties for first name, middle name, last name, address, admission date, membership renewal date, dues paid status, and the like. A car record might include properties such as manufacturer, model, year, transmission type, color, miles per gallon in city, miles per gallon on highway, and so forth. The database record 212A may be an actual database record in the database, or may be itself be constructed by evaluating an expression.

The database integration viewer 210A may provide any number of record viewers 221A, 222A and 223A, with the ellipses 224A representing that there may be other numbers of record viewers as well. The type of record viewer, and the manner in which the viewer is configured, may affect the appearance of the record as viewed by the user.

Figure 2B:
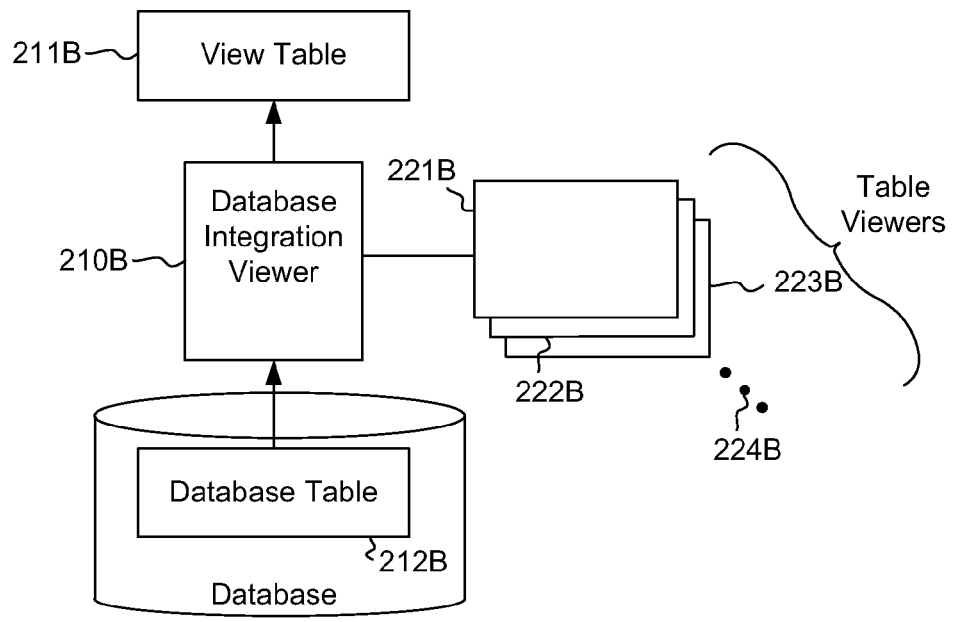
FIG. 2B illustrates an environment in which a database integration viewer formulates a view table that is a view of a database table.
Figure 3B:
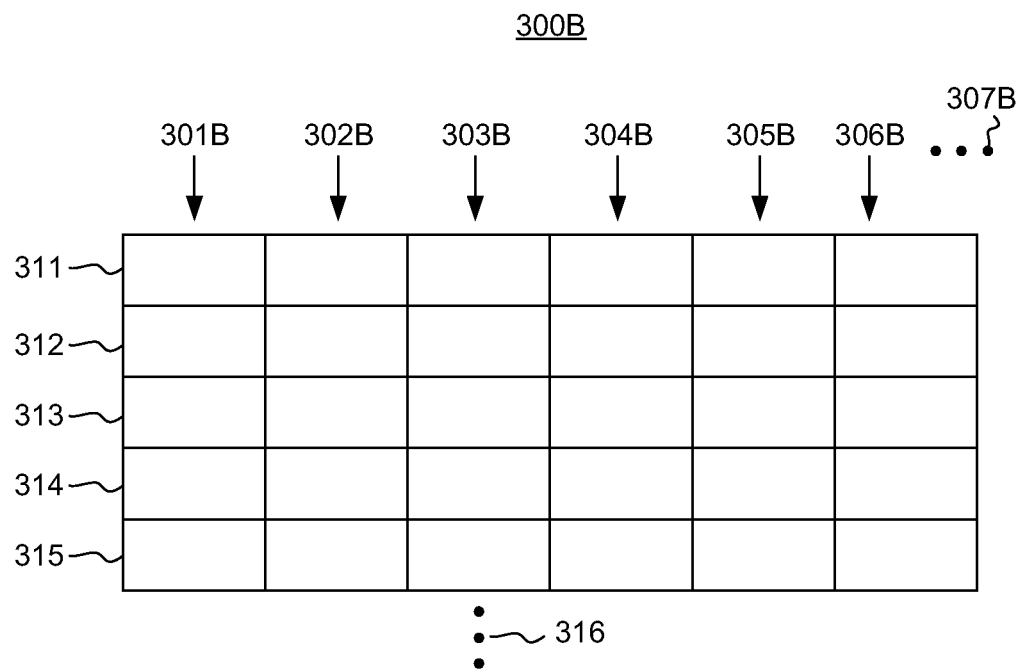
FIG. 3B illustrates a table that includes multiple records.

FIG. 2B illustrates an environment 200B in which a data integration viewer 210B may be used to formulate a view table 211B that is a view of a database table 212B. The database table 212B is an actual table in a database, whereas the view table 212B is simply a view on that database table 212B, and need not reflect the actual structure of the table exactly. FIG. 3B illustrates a database table 300B. A table typically contains multiple records that have a similar schema. Each row in the table represents a record, whereas each column of the table corresponds to a property. Thus, a particular property of a particular record may be found in the table by finding the intersection of the row corresponding to the record, and the column corresponding to the property. The example database table 300B of FIG. 3B includes records 311 through 315, with the ellipses 316 representing that the table 300B may have any number of records. The example database table 300B also includes six columns corresponding to properties 301B, 302B, 303B, 304B, 305B and 306B, with the ellipses 307B representing that there may be other numbers of properties as well. As an example, a club membership table may include a row for each member of the club.

The database integration viewer 210B may provide any number of table viewers 221B, 222B and 223B, with the ellipses 224B representing that there may be other numbers of table viewers as well. The type of table viewer, and the manner in which the viewer is configured, may affect the appearance of the table as viewed by the user.

Figure 4:
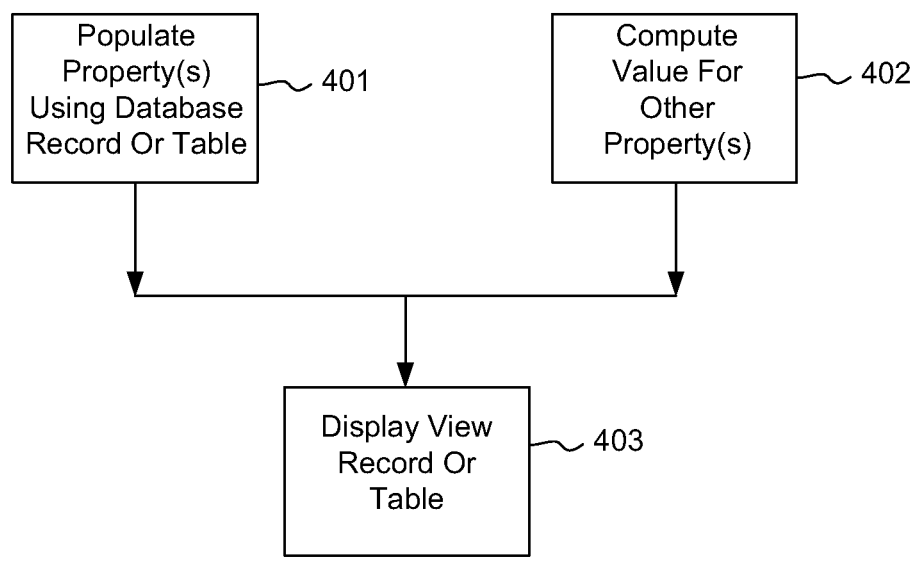
FIG. 4 illustrates a flowchart of a method for formulating a view record or table.

FIG. 4 illustrates a flowchart of a method 400 for formulation a view record or table. The method 400 may be performed in the environment 200A of FIG. 2A to formulate a view record, or in the environment 200B of FIG. 2B to formulate a view table. First, the application of the method 400 of FIG. 4 to the environment 200A of FIG. 2A will be described.

According to the method 400, for at least one, perhaps some, and perhaps all of the properties of the database record, the corresponding property in the view record is populated using the corresponding property of the database record (act 401). As an example, the value of the corresponding property in the view table may be assigned as being the same as the value of the corresponding property of the database record.

Figure 6A:
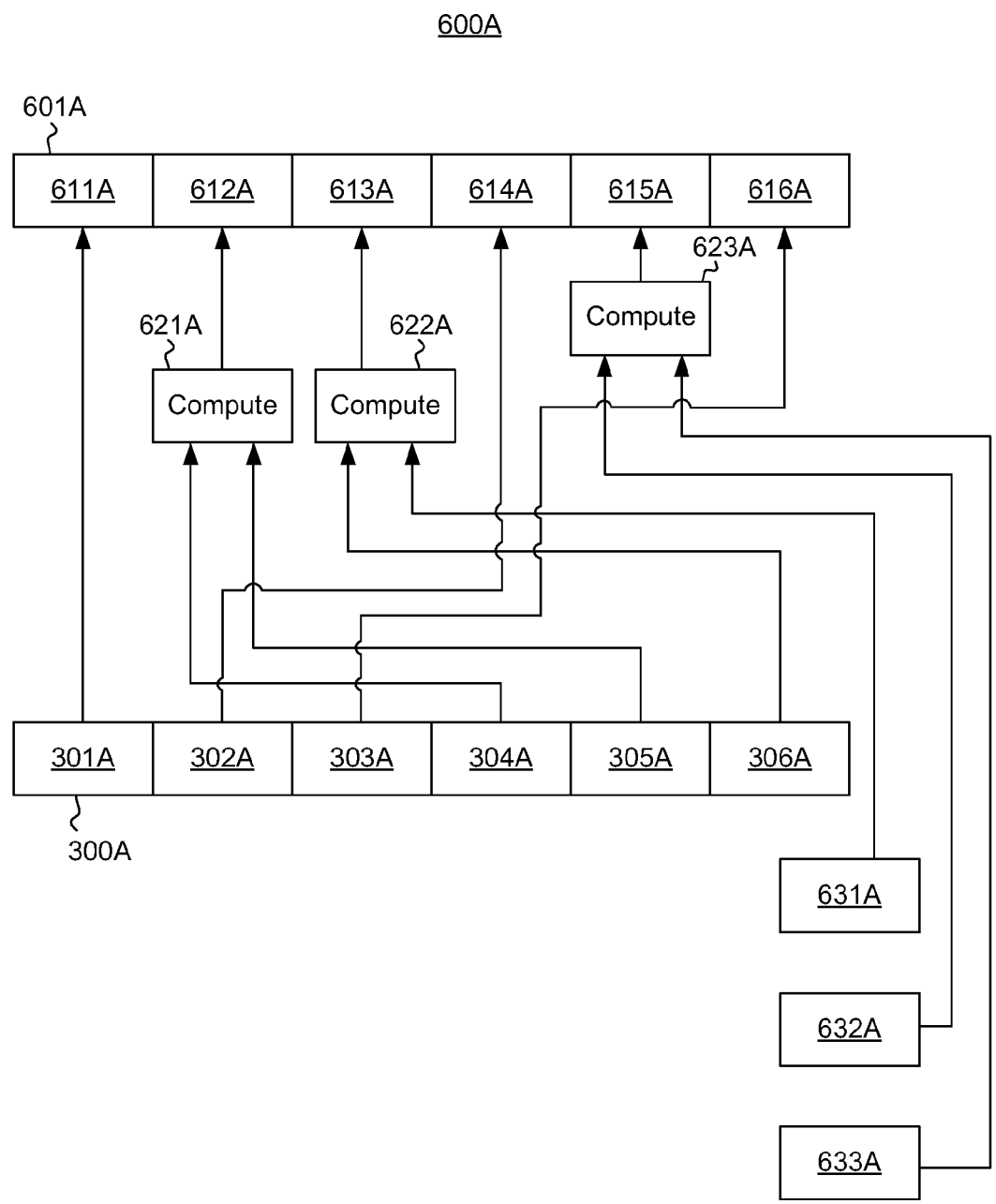
FIG. 6A illustrates an example logical flow that maps a database record to a view record.

FIG. 6A illustrates an example 600A in which some of the properties of the database record are mapped to corresponding properties of the view record so that the values are the same. FIG. 6A is just an example as the principles described herein may be applied to any configuration in which one or more properties of database records are mapped to corresponding properties of the view record. In FIG. 6A, the database record 300A of FIG. 3A is used in which there are six properties 301A, 302A, 303A, 304A, 305A and 306A. In the view record 601A, there are also six properties 611A, 612A, 613A, 614A, 615A and 616A. Three of the view record properties are mapped directly with a corresponding database record property. For instance, database record property 301A is mapped to view record property 611A, database record property 302A is mapped to view record property 614A, and database record property 303A is mapped to view record property 616A.

For at least one of the properties of the view record, the integrated database viewer computes a value for the property (act 402). In FIG. 6A, for example, the value of property 612A is computed using the value of property 304A and the value of property 305A as input. Specifically, the result from the computation 621A is provided as the value of the property 612A For instance, perhaps property 612A is a full name property, whereas property 304A was a first name property, and property 305A was a last name property. In that case, the computation might be a concatenation of the two string values from 304A and 305A to formulate another string for population into property 612A.

The computed property may also be computed using data external to the database record in addition to, or as an alternative to, the data from the database record. For instance, referring to FIG. 6A, the value of property 613A is computed based on external data 631A, as well as using the value from the database record property 306A. That external data 631A might be, for example, another database record, or perhaps from another database table. In FIG. 6A, this is accomplished by computation 622A.

The computed property may also be computed using multiple external pieces of data from multiple sources external to the database record. For instance, referring to FIG. 6A, the value of property 615A is computed based on external data 632A and external data 633A using computation 623A. The external data may be data from outside of the database record, or outside of the database table in which the database record appears. The external data 632A and 633A may be within another database record or another database table, or need not be within the database at all. For instance, the external data may have been obtained over the Internet from a remote source.

With the properties acquired, the method may display the view record (act 403), which includes the properties of the database as well as the one or more computed properties. FIG. 6A illustrates an example of such a view record, although as previously mentioned, the view record may have any number of computed properties. In addition, there may be any number of views on the view record as described with respect to record viewers 221A, 222A and 223A.

FIG. 4, which has just been described with respect to a view record of FIG. 6A, will now be described with respect to a view table of FIG. 6B in which the method in performed in environment 200B of FIG. 2B to formulate a view table. According to the method 400, for at least one, perhaps some, and perhaps all of the properties of the database table, the corresponding property in the view record is populated using the corresponding property of the database record (act 401). As an example, the value of the corresponding property in the view table may be assigned as being the same as the value of the corresponding property of the database table.

Figure 6B:
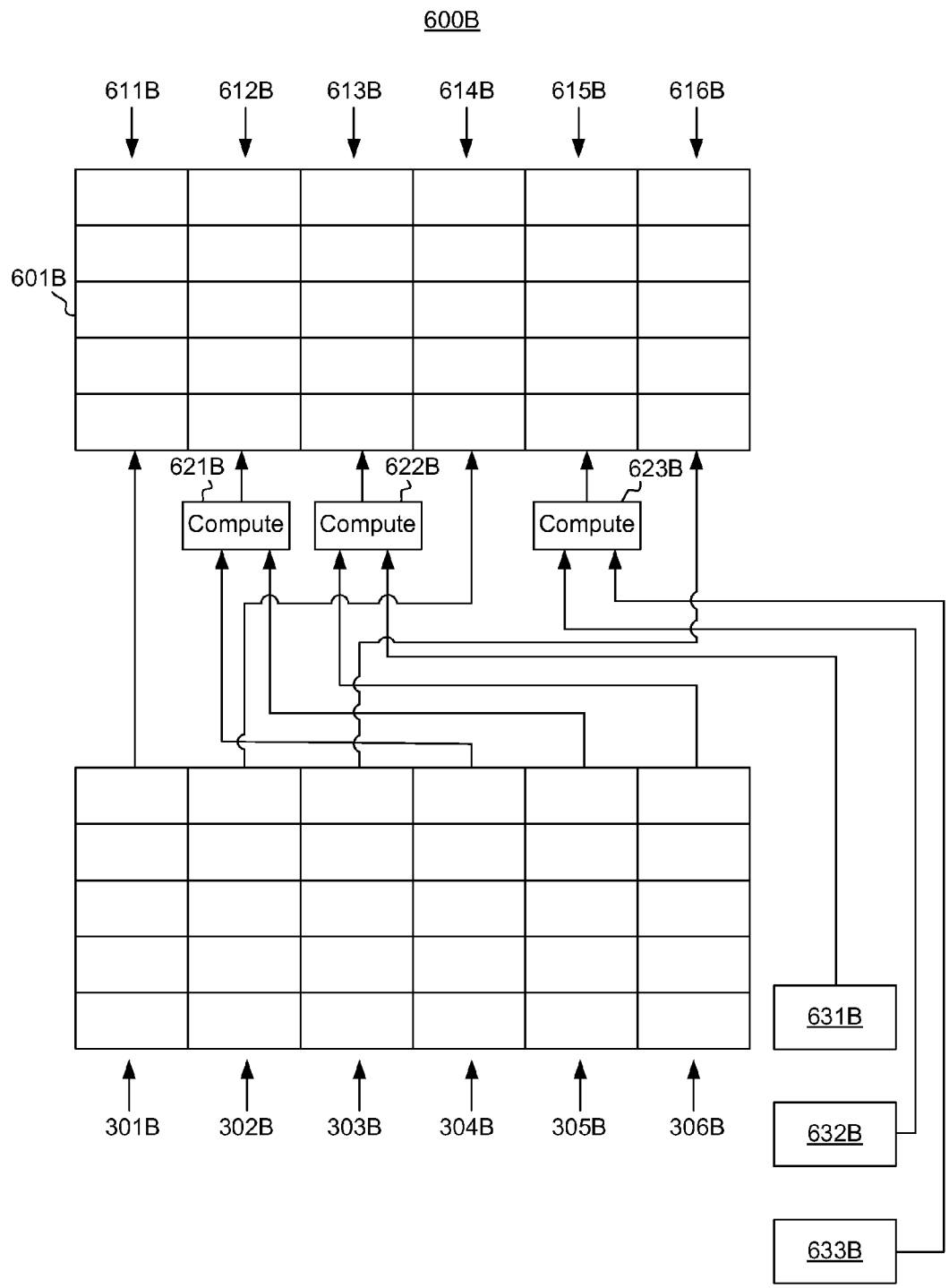
FIG. 6B illustrates an example logical flow that maps a database table to a view table.

FIG. 6B illustrates an example in which some of the properties of the database table are mapped to corresponding properties of the view table so that the values are the same. FIG. 6B is just an example as the principles described herein may be applied to any configuration in which one or more properties of database tables are mapped to corresponding properties of the view table. In FIG. 6B, the database table 300B of FIG. 3B is used in which there are six properties 301B, 302B, 303B, 304B, 305B and 306B. In the view table 601B, there are also six properties 611B, 612B, 613B, 614B, 615B and 616B, each corresponding to a column of the table. Three of the view table properties are mapped directly with a corresponding database table property. For instance, database table property 301B is mapped to view table property 611B, database table property 302B is mapped to view table property 614B, and database table property 303B is mapped to view table property 616B.

For at least one of the properties of the view table, the integrated database viewer computes a value for the property (act 402). In FIG. 6B, for example, for each row in the table, the value of property 612B is computed 621B using the value of property 304B and the value of property 305B as input. For instance, perhaps property 612B is a full name property, whereas property 304B was a first name property, and property 305B was a last name property. In that case, for each row, the computation might be a concatenation of the two string values from 304B and 305B to formulate another string for population into property 612B.

The computed property may also be computed using data external to the database table in addition to, or as an alternative to, the data from the database table. For instance, referring to FIG. 6B, the value of property 613B is computed based on external data 631B, as well as using the value from the database table property 306B. That external data 631B might be, for example, another database record, or perhaps from another database table. In FIG. 6B, this is accomplished by computation 622B.

The computed property may also be computed using multiple external pieces of data from multiple sources external to the database record. For instance, referring to FIG. 6B, for each row, the value of property 605B is computed based on external data 632B and external data 633B using computation 623B. The external data may be data from outside of the database record, or outside of the database table in which the database record appears. The external data 632B and 633B may be within another database record or another database table, or need not be within the database at all. For instance, the external data may have been obtained over the Internet from a remote source.

With the properties acquired, the method may display the view table (act 403), which includes the properties of the database table as well as the one or more computed properties. FIG. 6B illustrates an example of such a view table, although as previously mentioned, the view table may have any number of computed properties. In addition, there may be any number of views on the view table as described with respect to table viewers 221B, 222B and 223B.

For each computed property, there may be an expression that is evaluated in order to compute the value of the computed property. In the case of a record, the expression may be assigned to a particular property of the record, in which case the result of the computation is assigned as the value of that particular property in the view record. In the case of a table, the expression may be assigned to a particular property of the view table. In that case, the expression may be evaluated for each row in the table to assign the computed property value into the column corresponding to the particular property for each row in the view table.

The expression may be a simple scalar value, in which case the scalar value is simply assigned as the computed property value. Alternatively, the expression may be an arithmetic expression that might, or might not, contain input parameters. If the expression does contain input parameters, the input parameters may be references to properties and locations external to the database record or database table that is acting as a source for other properties of the view record or view table.

Figure 5:
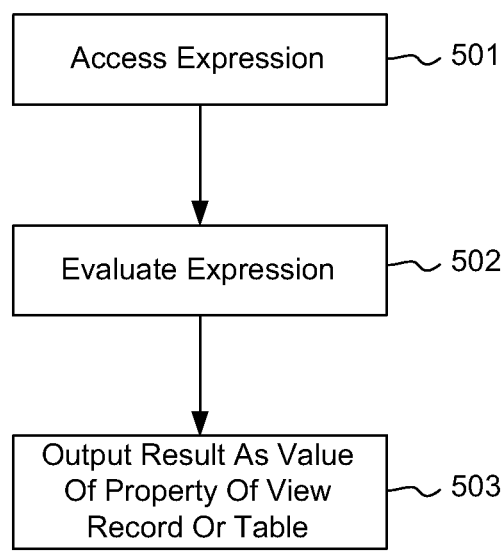
FIG. 5 illustrates a method for computing a computed property.

FIG. 5 illustrates a method 500 for computing a computed property, which may be performed for each computed property. The expression associated with the computed property is accessed (act 501). The expression is then evaluated (act 502), and the result of the expression is assigned as the value of the computed property (act 503).

The result of the expression evaluation may itself be of any form. For instance, the result may be a scalar, or may be an entire record, or perhaps may be a collection of records.

Thus, the principles described herein allow a view record or table to be constructed in a flexible way using data from not only the underlying database record or table, but also using data from other portions of the database, or even data external to the database. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising one or more physical computer-readable storage devices having thereon computer-executable instructions that, when executed by one or more processors of the computing system, cause the computing system to instantiate a database integration viewer, the database integration viewer configured to formulate a view table that is a view of a database table, the database table being one of one or more tables within a database, by performing the following:
   instantiating a database view including the view table;
   for each of a plurality of properties of the database table, an act of populating a corresponding property in the view table using the corresponding property of the database table;
   for a first property of the view table, computing a value for the first property using at least one value which is obtained external to the database;
   for a second property of the view table, computing a value for the second property using at least a property within the database table;
   mapping each of the plurality of properties, the computed first property, and the computed second property into corresponding elements of the view table; and
   displaying the view table including displaying the plurality of properties of the database table, the computed first property, and displaying the computed second property.

2. The computer program product in accordance with claim 1, further comprising displaying in the view table a plurality of properties computed from a plurality of properties within the database table.

3. The computer program product in accordance with claim 1, wherein the computed first property is an assigned scalar value.

4. The computer program product in accordance with claim 1, wherein for the computed first property, the act of computing the value for the first property is performed by performing the following:
   an act of accessing an expression;
   an act of evaluating the expression;
   an act of assigning a result of the expression as the value of the computed first property.

5. The computer program product in accordance with claim 4, wherein the expression includes as input a reference to a property from a second database table.

6. The computer program product in accordance with claim 5, wherein the expression also includes as input a reference to a property from a third database table.

7. The computer program product in accordance with claim 4, wherein the expression is a reference to a property from a record outside the database table.

8. The computer program product in accordance with claim 4, wherein the expression is an arithmetic expression.

9. The computer program product in accordance with claim 4, wherein the result of the expression is a scalar.

10. The computer program product in accordance with claim 4, wherein the result of the expression comprises a record.

11. The computer program product in accordance with claim 4, wherein the result of the expression comprises a plurality of records.

12. The computer program product in accordance with claim 1, wherein integrated database viewer is one of a plurality of table viewers offered by the computer program product.

13. A computer program product comprising one or more physical computer-readable storage devices having thereon computer-executable instructions that, when executed by one or more processors of the computing system, cause the computing system to instantiate a database integration viewer, the database integration viewer configured to formulate a view record that is a view of a database record, the database record being one of one or more records within a database, by performing the following:
   instantiating a database view including a view record;
   for each of a plurality of properties of the database record, an act of populating a corresponding property in the view record using the corresponding property of the database record;
   for first property of the view record, computing a value for the first property using at least one value which is obtained external to the database;
   for a second property of the view record, computing a value for the second property using at least a property within the database record;
   mapping each of the plurality of properties of the database record, the computed first property, and the computed second property into corresponding fields of the view record; and
   displaying the view record including displaying the plurality of properties of the database record, displaying the computed first property, and displaying the computed second property.

14. The computer program product in accordance with claim 13, further comprising displaying in the view record a plurality of properties computed from a plurality of properties within the database record.

15. The computer program product in accordance with claim 13, wherein the plurality of properties of the database record comprises all of the properties of the database record.

16. The computer program product in accordance with claim 13, wherein the database record is part of a database table.

17. The computer program product in accordance with claim 13, wherein for the computed first property, computing the value for the first property is performed by performing the following:
- an act of accessing an expression;
- an act of evaluating the expression;
- an act of assigning a result of the expression as the value of the computed first property.

18. The computer program product in accordance with claim 17, wherein the expression includes as input a reference to a property from outside of the database record.

19. The computer program product in accordance with claim 17, wherein the result of the expression comprises a plurality of records.

20. A computer-implemented method for formulating a view table that is a view of a database table, the database table being one of one or more tables within a database, the method comprising:
- instantiating a database view including the view table;
- for each of a plurality of properties of the database table, equating a value of a corresponding property in the view table as being the same as a value of the corresponding property of the database table;
- for at least one property of the view table, computing a value for the at least one property using at least one value which is obtained external to the database, the computation following an expression associated with the at least one property of the view table, each of the at least one property of the view table corresponding to a column in the view table, wherein the act of computing the value comprises:
    - an act of accessing an expression;
    - an act of evaluating the expression;
    - an act of assigning a result of the expression as the value of the computed property;
- for a second property of the view table, computing a value for the second property using at least a property within the database table;
- mapping each of the plurality of properties, the computed first property, and the computed second property into corresponding elements of the view table; and
- displaying the view table including displaying the plurality of properties of the database table, displaying the computed at least one property, and displaying the computed second property.

* * * * *